G. E. CARLETON
Horse Hay-Rake.
No. 107,660. Patented Sept. 27. 1870.
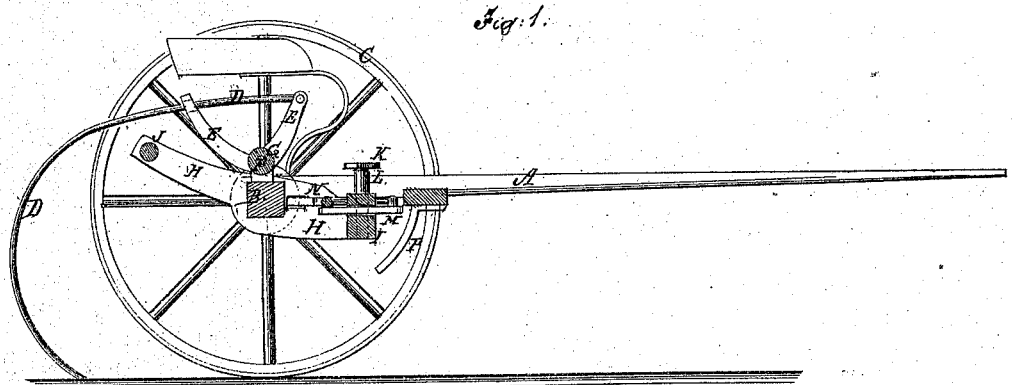
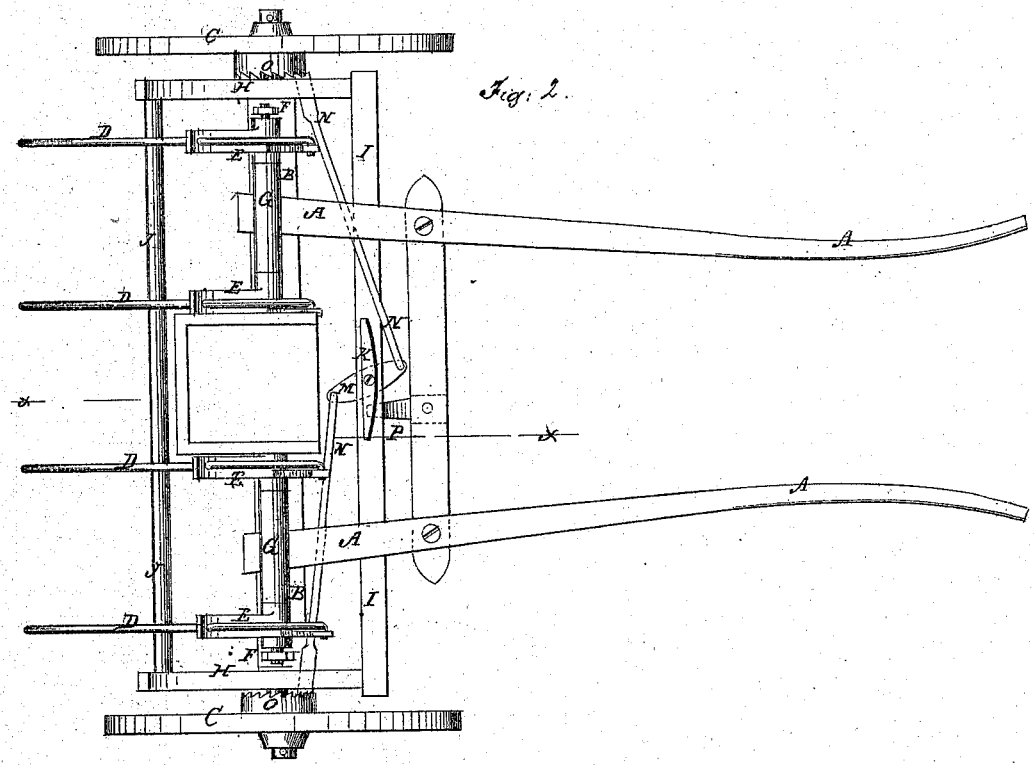
Witnesses:
Chas. Nida
L. S. Mabu
Inventor.
G. E. Carleton
Per Munn & Co
Attorneys.

United States Patent Office.

GUY E. CARLETON, OF OLD TOWN, MAINE.

Letters Patent No. 107,660, dated September 27, 1870.

IMPROVEMENT IN HORSE HAY-RAKES.

The Schedule referred to in these Letters Patent and making part of the same.

*To all whom it may concern:*

Be it known that I, GUY E. CARLETON, of Old Town, in the county of Penobscot and State of Maine, have invented a new and useful Improvement in Horse Hay-Rakes; and do hereby declare that the following is a full, clear, and exact description thereof, which will enable others skilled in the art to make and use the same, reference being had to the accompanying drawing forming part of this specification.

Figure 1 is a detail vertical section of my improved rake, taken through the line x x, fig. 2.

Figure 2 is a top view of the same.

Similar letters of reference indicate corresponding parts.

My invention has for its object to improve the construction of horse hay-rakes; and It consists in the construction and combination of various parts of the machine, as hereinafter more fully described.

A are the shafts, the rear ends of which are securely and rigidly attached to the axle B C are the drive-wheels, which are connected with and revolve upon the axles of the axle-tree B in the ordinary manner.

D are the rake-teeth, which are made in about the shape shown in fig. 1, and the upper ends of which pass through the rear arms of the two-armed brackets E, and are secured to the forward arms of said brackets E.

The brackets E are placed upon a rod, F, extending along the upper side of the axle-tree B, and the ends of which are secured to eye-bolts or other supports attached to said axle-tree.

The brackets E are kept at the proper distance apart, upon the rod F, by tubular washers, G, placed upon the said rod between the said brackets.

H are bars through holes, in the middle part of which pass the axles of the axle-tree B, so that the said arms may ride upon the said axle-tree close to the inner ends of the hubs of the wheels C.

The forward and rear ends of the bars H are connected respectively by the bars I J, running parallel with the axle-tree B, as shown in fig. 2.

K is a short cross or foot-bar, to the middle part of which is attached the upper end of the short vertical shaft L, which passes down through the middle part of the bar I, and to which is attached a short cross-bar, M, to the ends of which are pivoted the inner ends of the bars or rods N, the outer ends of which pass through holes in the forward parts of the swinging bars H, and are so formed that, when pushed outward, they may engage with the ratchet-teeth or wheels O, formed upon or attached to the inner ends of the hubs of the wheels C.

By this construction, when a sufficient quantity of hay has been collected by the rake, the driver operates the cross-bar K with his foot, to force the bars or rods N outward, to cause their outer ends to engage with the ratchet-teeth O. This causes the frame H I J to be carried around by and with the wheels C, so that the rear bar J will come in contact with the teeth D or the rear arms of the brackets E, and thus raise the rake-teeth from the ground, dropping the collected hay.

As the frame H I J is being carried around with the wheels C, the end of the cross-bar K strikes against an arm or stop, P, attached to the cross-bar of the thills A, or to some other convenient support. This draws the bars or rods N inward, and allows the teeth E to drop back to the ground by their own weight, to again collect the hay.

I am aware that rakes have been constructed so that the rake may be raised to discharge the collected hay by the advance of the machine. This I do not claim; but

Having thus described my invention,

I claim as new and desire to secure by Letters Patent—

The combination of foot-bar K, cross-bar M, pin L, rods N, frame H I J, and stop P, all constructed and relatively arranged as specified, to operate in connection with the ratchet-teeth on wheels O, for the purpose set forth.

GUY E. CARLETON.

Witnesses:
C. A. BAILEY,
O. H. CARLETON.